United States Patent [19]

Yeh et al.

[11] Patent Number: 5,025,488
[45] Date of Patent: Jun. 18, 1991

[54] OPTICAL HETERODYNE DETECTOR

[75] Inventors: Pochi A. Yeh, Thousand Oaks; John H. Hong, Moorpark, both of Calif.

[73] Assignee: Rockwell International Corporation, El Segundo, Calif.

[21] Appl. No.: 437,968

[22] Filed: Nov. 16, 1989

[51] Int. Cl.$^5$ .................................................. G02F 1/00
[52] U.S. Cl. ..................................... 455/619; 350/3.67
[58] Field of Search .................... 350/3.67, 3.68, 3.81, 350/3.83, 3.6, 3.62, 3.64, 3.66; 455/619

[56] References Cited

U.S. PATENT DOCUMENTS

| | | | |
|---|---|---|---|
| 3,610,932 | 10/1971 | Morse et al. | 455/619 |
| 4,442,455 | 4/1984 | Huignard et al. | 350/3.63 |
| 4,761,059 | 8/1988 | Yeh et al. | 350/354 |
| 4,911,537 | 3/1990 | Ewbank | 350/354 |

OTHER PUBLICATIONS

Morimoto et al., "A Picosecond Optical Gate using Photo-Induced Grating", Japanese Journal of Applied Physics, vol. 20, No. 6, Jun. 1981, pp. 1129–1133.

J. Shamir et al., "Wavefront Conjugation and Amplification for Optical Communication Through Distorting Media", Applied Optics, vol. 27, No. 14, pp. 2912–2914, Jul. 15, 1988.

Primary Examiner—Reinhard J. Eisenzopf
Assistant Examiner—Geoff Sutcliffe
Attorney, Agent, or Firm—John C. McFarren

[57] ABSTRACT

Nonlinear optical devices and techniques are used to provide heterodyne detection for coherent optical communications. Heterodyne detection is achieved by matching the wave front of a local oscillator beam with the wave front of a received optical signal. Precise wave front matching provides high heterodyne efficiency and a wide field of view. In one embodiment, the received signal and a reference beam of the same frequency are directed into a nonlinear medium to form a volume hologram that contains the spatial information of the received signal. The reference beam is alternated with a local oscillator beam that has the same wave front and is parallel to the reference beam but at a different frequency. The hologram matches the wave fronts of the signal beam and the local oscillator beam to produce a large heterodyne signal. In an alternative embodiment, the received signal beam and the local oscillator beam are directed into a mutually pumped phase conjugator (MPPC). The MPPC generates a spatial phase conjugate of the oscillator beam that carries the temporal characteristics of the signal beam. A beam splitter combines the information carrying phase conjugate beam with a phase conjugate of the pure local oscillator beam returned by a phase conjugate mirror. The two phase conjugate beams arrive at the plane of a photodetector with precisely the same wave front and direction. The matched wave fronts produce high heterodyne efficiency, and the automatic tracking feature of the phase conjugators provides a wide field of view.

10 Claims, 1 Drawing Sheet

OPTICAL HETERODYNE DETECTOR

TECHNICAL FIELD

The present invention relates to optical communication systems and, in particular, to optical systems for heterodyne detection.

BACKGROUND OF THE INVENTION

Coherent optical communication systems generally extract information from an incoming signal beam by superimposing a local oscillator beam on the received signal. In a typical coherent optical communication receiver, the received optical wave, which carries a temporal modulation to be detected, is combined with a locally generated optical wave, which is frequency shifted by a small amount from the received wave. The combined optical waves are directed to a photodetector to detect a beat signal that is proportional to the temporal modulation.

A problem arises, however, when the received wave front is not well matched with the wave front from the local oscillator. Phase distortions, which are especially harmful, result in low signal-to-noise ratios from the photodetector. As a practical matter, all optical wave fronts become distorted when propagating through a real atmosphere. As a result, coherent communication through the atmosphere has required the use of spatial filter systems that reduce the strength of the already weak received signals. The signal fading that results from these systems has made coherent communications restrictive and difficult when passing through distorting media. Thus, there is a need for optical systems that detect heterodyne beat frequencies to improve coherent optical communications.

SUMMARY OF THE INVENTION

The present invention includes nonlinear optical devices and techniques for heterodyne detection in coherent optical communication systems. A primary function of the present invention is to match the wave front of a local oscillator beam with the spatial profile and propagation direction of s received optical signal at the plane of a photodetector. The beam mixing characteristics of nonlinear optical devices enable the system to achieve high heterodyne efficiency and a wide field of view.

In one embodiment of the invention, a weak optical signal beam and a reference beam of the same frequency are directed into a nonlinear medium such as a photorefractive crystal. Interaction of the two beams in the crystal forms a volume hologram that contains the spatial information of the weak signal beam. The reference beam is alternated with a local oscillator beam having a different frequency, but the wave front of the oscillator beam is otherwise identical and parallel to the wave front of the reference beam. The portion of the signal beam diffracted by the hologram retains the spatial information of the signal beam but acquires the same wave front as that of the reference beam. Combining the diffracted signal beam with the undiffracted portion of the local oscillator beam produces a large heterodyne signal because of the matched wave fronts. Alternatively, the undiffracted portion of the signal beam can be combined with the diffracted portion of the local oscillator beam. In this case, the diffracted oscillator beam acquires the same wave front as that of the signal beam, and combining these beams with the same wave fronts also produces a large heterodyne signal.

In an alternative embodiment of the invention, the received signal beam is directed into a mutually pumped phase conjugator (MPPC). The local oscillator beam is directed through a beam splitter so that a transmitted portion of the oscillator beam enters the MPPC and a reflected portion is directed to a phase conjugate mirror. The MPPC generates a spatial phase conjugate of the oscillator beam that carries the temporal characteristics of the signal beam. The beam splitter serves to combine a reflected portion of the signal carrying phase conjugate beam with a transmitted portion of the local oscillator beam returned by the phase conjugate mirror. The two phase conjugate beams arrive at the plane of a photodetector with precisely the same wave front and direction. The matched wave fronts produce high heterodyne efficiency, and the automatic tracking feature of the phase conjugators provides a wide field of view.

BRIEF DESCRIPTION OF THE DRAWINGS

For a more complete understanding of the present invention and for further advantages thereof, the following Description of the Preferred Embodiments makes reference to the accompanying Drawings, in which.

DESCRIPTION OF THE PREFERRED EMBODIMENTS

The present invention applies heterodyne techniques and nonlinear optics to coherent optical communication systems to improve detection of weak, spatially distorted optical signals. The special characteristics of nonlinear optical devices are utilized to match the wave front of the received optical signal with the wave front of a local oscillator beam.

Figure 1A:
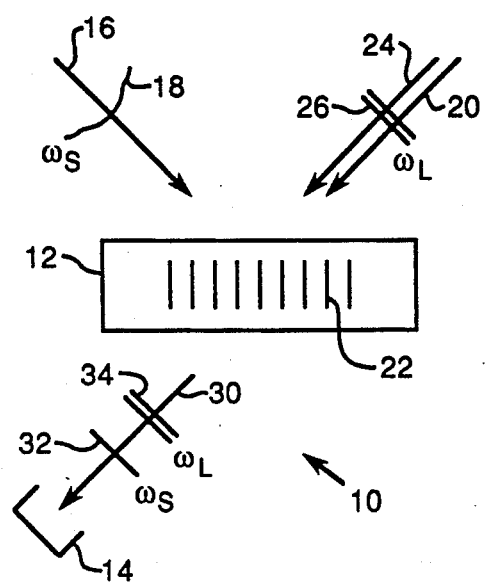
FIGS. 1A and 1B are schematic diagrams of an optical heterodyne detector that uses a photorefractive crystal to produce a volume hologram for matching light beam wave fronts.
Figure 1B:
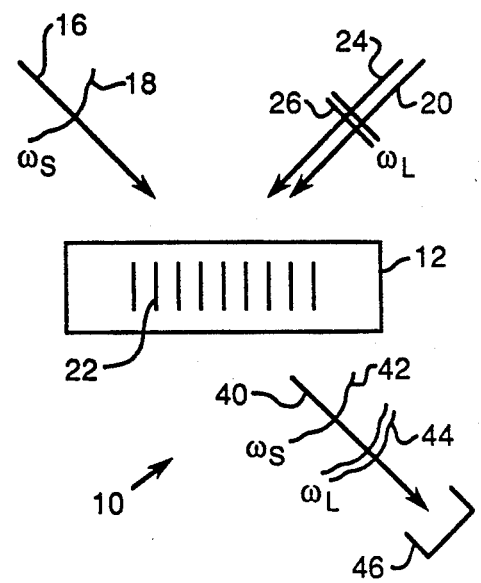

One embodiment of an optical heterodyne detector is illustrated in FIGS. 1A and 1B. The optical heterodyne detector 10 of FIG. 1A comprises a nonlinear medium, such as a photorefractive crystal 12, and a photodetector 14. Detector 10 also includes various light beam focusing and directing devices that are well known in the art and thus omitted from the figures. A received signal beam 16 at frequency $\omega_S$ having an unknown wave front 18 is directed into crystal 12. A reference beam 20 having the same frequency as signal beam 16 but with a known wave front, typically planar, is also directed into crystal 12. The interaction of beams 16 and 20 in crystal 12 forms a volume hologram 22 that contains the spatial information of signal beam 16. After hologram 22 is written in crystal 12, reference beam 20 is turned off and a local oscillator beam 24 is turned on. Oscillator beam 24 has a frequency of $\omega_L$ but otherwise is parallel to and has the same wave front 26 as that of reference beam 20. When reference beam 20 is turned off, a portion of signal beam 16 is diffracted by hologram 22 into beam 30. In accordance with the nonlinear properties of hologram 22, beam 30 carries the spatial information of received beam 16 but it acquires a wave front 32 defined by the wave front of reference beam 20.

A portion of oscillator beam 24 remains undiffracted by hologram 22 and forms a wave front 34 that is combined with wave front 32 in beam 30. Beam 30 is then detected by photodetector 14. Because beam 30 contains wave front 32 (at frequency $\omega_S$) that is precisely matched with wave front 34 (at frequency $\omega_L$), a large heterodyne signal is detected by photodetector 14. To reiterate, reference beam 20 and oscillator beam 24 are turned on and off in alternating time periods Reference beam 20 interacts with signal beam 16 to generate hologram 22, and then oscillator beam 24 and signal beam 16 interact with hologram 22 to match wave fronts and produce the heterodyne signal in beam 30.

As illustrated in FIG. 1B, optical heterodyne detector 10 may be used to match wave fronts in an alternative manner. Signal beam 16 and reference beam 20 having the same frequency interact in photorefractive crystal 12 to form volume hologram 22 as described above. However, as shown in FIG. 1B, a portion of local oscillator beam 24 is diffracted by hologram 22 and combined with the undiffracted portion of signal beam 16 to form a beam 40. As a result of diffraction by hologram 22, wave front 26 of oscillator beam 24 acquires a wave front 44 that matches undiffracted wave front 42 of signal beam 16. Beam 40, which combines light beams having frequencies $\omega_X$ and $\omega$, produces a strong heterodyne signal because of the matched wave fronts 42 and 44. The heterodyne signal of beam 40 is detected by a photodetector 46.

The signal-to-noise ratio of optical heterodyne detector 10 can be improved by detecting the heterodyne signals of beams 30 and 40 simultaneously. The two separate signals from photodetectors 14 and 46 can be combined electrically in a summing junction (not shown) as is well known in the art, thereby increasing the signal-to-noise ratio of the output of heterodyne detector 10.

If photorefractive crystal 12 of FIGS. 1A and 1B is replaced by a fast nonlinear medium, such as a Kerr medium, reference beam 20 can have a frequency $\omega_R$ that is different from the frequency $\omega_S$ of signal beam 16. In this case, interaction of the reference beam with the signal beam will produce a traveling hologram in the Kerr medium. The beam diffracted by the traveling hologram will be accompanied by a frequency shift that produces a heterodyne signal when mixed with the undiffracted beam. This detection technique provides a large heterodyne gain and a very large field of view.

Figure 2:
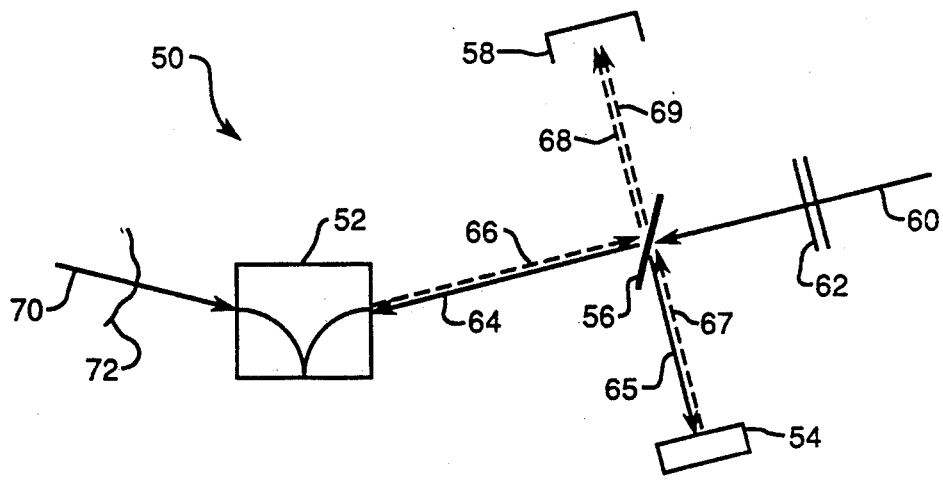
FIG. 2 is a schematic diagram of an alternative embodiment of an optical heterodyne detector that uses a mutually pumped phase conjugator and a phase conjugate mirror to match light beam wave fronts.

An alternative embodiment of the present invention is illustrated in FIG. 2. Optical heterodyne detector 50 utilizes a mutually pumped phase conjugator (MPPC) 52, a phase conjugate mirror 54, and a beam splitter 56. As shown in FIG. 2, a local oscillator beam 60 having a wave front 62 is directed through beam splitter 56. Beam splitter 56 divides oscillator beam 60 into a transmitted beam 64 and a reflected beam 65. Beam 65 is returned as phase conjugate beam 67 by phase conjugate mirror 54. For clarity of illustration, phase conjugate beams are shown in FIG. 2 as broken lines. Phase conjugate mirror 54 may comprise a self-pumped phase conjugator (SPPC) or an externally pumped phase conjugator that can return a stronger phase conjugate beam 67 than input beam 65. Phase conjugate beam 67 is a time-reversed version of oscillator beam 65, and it remains spectrally pure with no temporal modulation. Beam 67 passes through beam splitter 56 and becomes transmitted phase conjugate beam 69.

Transmitted oscillator beam 64 is input to MPPC 52 where it interacts with a received signal beam 70 having a wave front 72. MPPC 52 comprises a nonlinear medium such as a photorefractive crystal or a Kerr medium. Mixing of beams 64 and 70 in MPPC 52 produces a phase conjugate return beam 66 as is well known in the art. Beam 66 is a spatially phase conjugate version of oscillator beam 64, but beam 66 has the temporal characteristics of received signal beam 70. Beam 66 returns to beam splitter 56 where it is reflected to become reflected phase conjugate beam 68.

Phase conjugate beams 68 and 69 are directed by beam splitter 56 to a photodetector 58. Because beams 68 and 69 are both phase conjugates, or time-reversed versions, of local oscillator beam 60, they both arrive at photodetector 58 with precisely the same direction and wave fronts. However, beam 68 includes the temporal modulation of signal beam 70 while beam 69 has no temporal modulation. The precise wave front matching at photodetector 58 produces a heterodyne signal with high efficiency. Furthermore, the time-reversed characteristics of the phase conjugate beams cause heterodyne detector 50 to be relatively insensitive to the distance MPPC 52 and mirror 54 are positioned from beam splitter 56. This automatic tracking feature provides a wide field of view for heterodyne detection.

Although the present invention has been described with respect to specific embodiments thereof, various changes and modifications may be suggested to one skilled in the art. Therefore, it is intended that the present invention encompass such changes and modifications as fall within the scope of the appended claims.

We claim:

1. An optical heterodyne detector comprising:
   a received optical signal beam, said signal beam having a first frequency and a first wave front carrying spatial information;
   an optical reference beam having said first frequency and a second wave front;
   a local oscillator beam alternated in time with said reference beam, said local oscillator beam having a second frequency and said second wave front;
   a nonlinear optical medium for receiving and mixing said signal beam and said reference beam to produce a hologram in said nonlinear medium, said hologram containing said spatial information of said received optical signal beam;
   an output beam comprising diffracted and undiffracted components of said signal beam and said local oscillator beam passing through said hologram; and
   a photodetector for detecting an optical heterodyne signal produced by said components of said output beam.

2. The optical heterodyne detector of claim 1, wherein said output beam comprises an undiffracted component of said oscillator beam having said second wave front and a diffracted component of said signal beam having said second wave front.

3. The optical heterodyne detector of claim 1, wherein said output beam comprises an undiffracted component of said signal beam having said first wave front and a diffracted component of said oscillator beam having said first wave front.

4. A method of optical heterodyne detection, comprising the steps of:

receiving an optical signal beam, said signal beam having a first frequency and a first wave front carrying spatial information;

providing an optical reference beam, said reference beam having said first frequency and a second wave front;

providing a local oscillator beam alternated in time with said reference beam, said local oscillator beam having a second frequency and said second wave front;

mixing said signal beam and said reference beam in a nonlinear medium to generate a hologram in said nonlinear medium, said hologram containing said spatial information of said signal beam;

directing said signal beam and said local oscillator beam through said hologram, said hologram producing an output beam comprising diffracted and undiffracted components of said signal beam and said local oscillator beam, said components having the same wave fronts; and detecting an optical heterodyne signal produced by said components of said output beam.

5. The method of claim 4, wherein the step of producing said output beam comprises:

producing a diffracted component of said signal beam having said second wave front and an undiffracted component of said local oscillator beam having said second wave front.

6. The method of claim 4, wherein the step of producing said output beam comprises:

producing a diffracted component of said local oscillator beam having said first wave front and an undiffracted component of said signal beam having said first wave front.

7. An optical heterodyne detector, comprising:

an optical local oscillator beam;

means for generating a temporally unmodulated first phase conjugate of said local oscillator beam;

means for generating a second phase conjugate of said local oscillator beam, said second phase conjugate temporally modulated by a received optical signal beam;

means for combining said unmodulated first phase conjugate beam and said modulated second phase conjugate beam to produce an optical heterodyne signal; and means for detecting said optical heterodyne signal.

8. The optical heterodyne detector of claim 7, wherein said means for generating said first and second phase conjugate beams comprise:

a beam splitter for dividing said local oscillator beam into a transmitted oscillator beam and a reflected oscillator beam;

a phase conjugate mirror for receiving said reflected oscillator beam and generating said unmodulated first phase conjugate of said local oscillator beam; and a mutually pumped phase conjugator for receiving said transmitted oscillator beam and said optical signal beam, said mutually pumped phase conjugator generating said modulated second phase conjugate of said local oscillator beam.

9. A method of optical heterodyne detection, comprising the steps of:

receiving an optical signal beam;

providing an optical local oscillator beam;

generating a temporally unmodulated first phase conjugate of said local oscillator beam;

generating a second phase conjugate of said local oscillator beam;

temporally modulating said second phase conjugate with said received optical signal beam;

combining said modulated and unmodulated phase conjugates to generate an optical heterodyne signal; and detecting said optical heterodyne signal.

10. The method of claim 9, further comprising:

splitting said local oscillator beam into a transmitted oscillator beam and a reflected oscillator beam;

providing a phase conjugate mirror for receiving said reflected oscillator beam and generating said unmodulated first phase conjugate of said local oscillator beam; and providing a mutually pumped phase conjugator for receiving said transmitted oscillator beam and said optical signal beam, said mutually pumped phase conjugator generating said modulated second phase conjugate of said local oscillator beam.

* * * * *